(12) United States Patent
Divo

(10) Patent No.: US 7,527,377 B2
(45) Date of Patent: May 5, 2009

(54) METHOD FOR MANUALLY CENTERING AN OPHTHALMIC LENS IN A CENTERING/BLOCKING DEVICE AND ASSOCIATED CENTERING/BLOCKING DEVICE

(75) Inventor: Fabien Divo, Charenton (FR)

(73) Assignee: Essilor International (Compagnie Generale d'Optique), Charenton (FR)

(*) Notice: Subject to any disclaimer, the term of this patent is extended or adjusted under 35 U.S.C. 154(b) by 154 days.

(21) Appl. No.: 10/590,346

(22) PCT Filed: Jan. 5, 2005

(86) PCT No.: PCT/FR2005/000010

§ 371 (c)(1),
(2), (4) Date: Aug. 23, 2006

(87) PCT Pub. No.: WO2005/092570

PCT Pub. Date: Oct. 6, 2005

(65) Prior Publication Data

US 2007/0177101 A1    Aug. 2, 2007

(30) Foreign Application Priority Data

Feb. 24, 2004    (FR) .................................. 04 01858

(51) Int. Cl.
*G02C 13/00* (2006.01)
(52) U.S. Cl. .................. 351/178; 351/177; 351/159; 351/246; 451/42
(58) Field of Classification Search .................. 351/178
See application file for complete search history.

(56) References Cited

U.S. PATENT DOCUMENTS 3,586,448 A    6/1971    Beasse (Continued)

FOREIGN PATENT DOCUMENTS

| EP | 0 409 760 | 1/1991 |
|----|-----------|--------|
| WO | 02/098606 | 12/2002 |
| WO | 01/25744  | 4/2006 |

*Primary Examiner*—Jessica T Stultz
(74) *Attorney, Agent, or Firm*—Young & Thompson

(57) ABSTRACT

Method of manually centering an ophthalmic lens, includes:
a) acquiring and storing the shadow of a predetermined geometrical figure formed on a transparent support interposed between lighting and acquisition elements while the support is illuminated;
b) superposing the lens and support;
c) acquiring and storing the detected by the lens while the latter and support are illuminated;
d) using the acquisition elements to acquire the shadow of the center and/or axis marking of the lens;
e) displaying firstly the shadow of the center and/or axis marking, and secondly a virtual centering target corresponding to the position desired for the center marking relative to a reference point of the rim of the frame;
f) deducing a corrected relative position for the reference point of the frame rim relative to the center marking, or vice versa; and
g) putting the shadow of the centering marking of the lens manually into coincidence with the centering virtual target.

19 Claims, 4 Drawing Sheets

U.S. PATENT DOCUMENTS

| | | | |
|---|---|---|---|
| 4,019,285 A | * | 4/1977 | Gravell ....................... 451/390 |
| 4,737,918 A | | 4/1988 | Paimpol et al. |
| 5,428,448 A | * | 6/1995 | Albert-Garcia ............. 356/612 |
| 5,867,259 A | * | 2/1999 | Yanagi et al. ............... 356/124 |
| 6,056,633 A | | 5/2000 | Sesena et al. |
| 7,191,030 B2 | * | 3/2007 | Videcoq ..................... 700/164 |
| 2001/0055111 A1 | * | 12/2001 | Yoda et al. .................. 356/127 |
| 2003/0112426 A1 | * | 6/2003 | Devie et al. ................. 356/124 |

* cited by examiner

Fig.5B
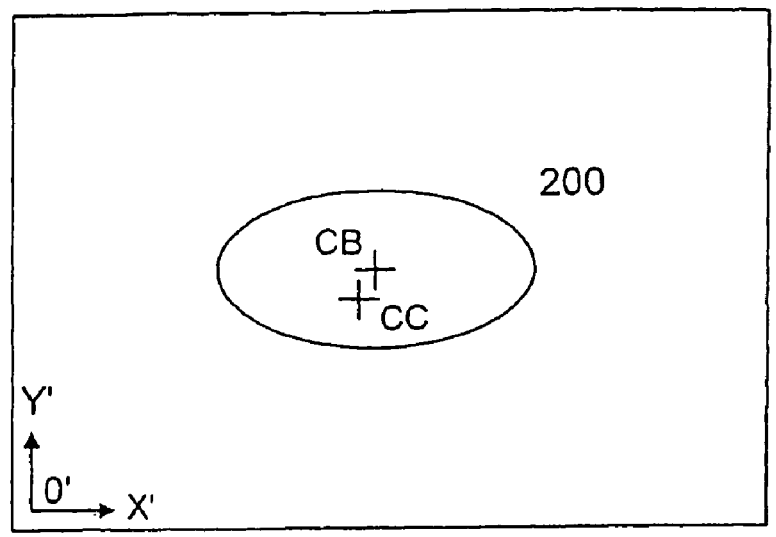
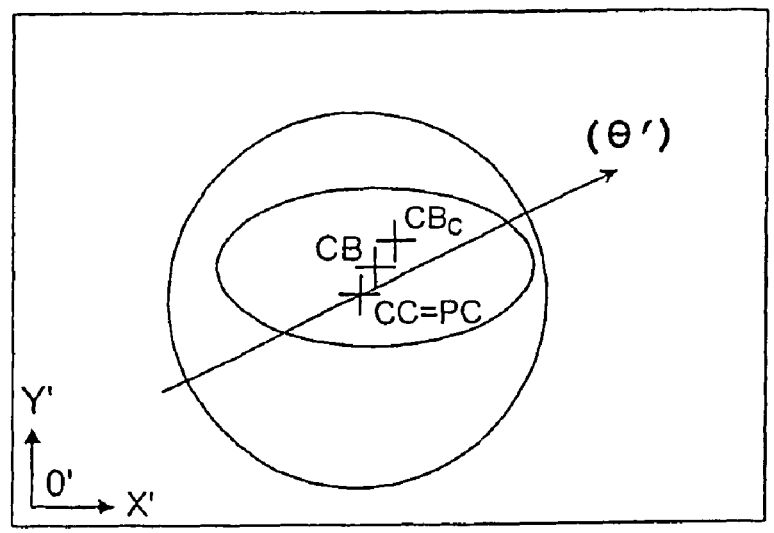
Fig.5C

METHOD FOR MANUALLY CENTERING AN OPHTHALMIC LENS IN A CENTERING/BLOCKING DEVICE AND ASSOCIATED CENTERING/BLOCKING DEVICE

TECHNICAL FIELD TO WHICH THE INVENTION RELATES

The present invention relates in general to mounting ophthalmic lenses in a frame.

More particularly, the invention relates to a method of manually centering an ophthalmic lens, and to a centering and blocking device for implementing such a method.

Such a centering and blocking device is adapted to determine the position of an optical center for a single-vision lens, or the position of one of the optical centers or any remarkable point referred to as a center point for a bifocal or trifocal lens, and it is also adapted to examining some of the markings that the manufacturer usually causes to appear on the surface of progressive lenses. A centering and blocking device is also adapted to determine by calculation a point on the surface of the lens defining the location where a handling peg is to be placed.

BACKGROUND OF THE INVENTION

Centering and blocking devices are appliances in widespread use in the field of optics. They are used in the process of fabricating a pair of spectacles, immediately prior to machining the ophthalmic lenses in order to fit them to the shape of the spectacles frame that has been selected.

Usually, a "raw" ophthalmic lens is substantially circular in shape, being of diameter that is sufficient to enable it to be mounted properly in the rim of the selected frame.

A centering and blocking device is then used to fix a handling peg on the ophthalmic lens in question, known as a "block".

In a subsequent fabrication step, the handling peg is used for rotating the ophthalmic lens in order to machine it.

The handling peg is put into place on the front face of the ophthalmic lens at a point that is determined by calculation as a function in particular of the position of the "optical center" (in the broad sense of the term) or more generally the center point of the lens, the shape of the selected frame, and certain characteristics of the wearer, in particular the pupillary distance or half-distance and the height of the frame (the height of the pupils relative to the bottom portions of the rims of the frame).

Whether in automatic mode or in manual mode, most previously-known centering and blocking devices detect the position of the optical center or of the center and/or axis markings of an ophthalmic lens by illuminating said lens by means of a light beam and by sensing the light beam that has passed through the lens. In the resulting image, the devices identify the shadows of the center and/or axis markings.

Such devices commit an error in detecting the position of the center markings (typically the mounting cross or the marking points that result from centering on a frontofocometer) and/or the axis markings (horizontal lines) of the ophthalmic lens. This error is the result of prismatic deflections of the shadows of the markings, induced by the lens itself, and depending on the spherical, cylindrical, and prismatic optical powers of the ophthalmic lens in the neighborhood of the marking in question.

For example, if the ophthalmic lens for centering presents lateral prismatic power in the neighborhood of the marking in question, the shadow of the marking in the image will appear offset laterally relative to the real position of the marking on the front face of said lens in a direction and by an amount corresponding to the angle of the prism.

Similarly, if the ophthalmic lens presents toroidal power, such centering and blocking devices can commit an error in detecting the axis marking if the axis formed by the markings and the main axis of the corresponding torus are not parallel or mutually perpendicular.

Furthermore, in automatic mode or in manual mode, the image observed by the signal acquisition means of prior art devices is displayed in real time on the display screen of the device for viewing by the operator.

In automatic mode, the operator can thus monitor and confirm the steps in the centering operation. In manual mode, the operator moves the ophthalmic lens by hand so as to bring the marking of said lens into coincidence with a centering sight encrusted in the displayed image.

Thus, any calculation for correcting the above-mentioned detection error needs to be performed in real time, which imposes short response times from the calculation equipment in order to ensure that the display is fluid. Nevertheless, the calculation hardware cannot make use of technology that is too expensive, given the market price for centering and blocking devices of this type.

In an attempt to remedy this problem of error in detecting the centering marking of a lens, document EP 0 409 760 proposes a centering and blocking device in which, firstly the light path of the light for detecting the position of the optical center or of the center and/or axis markings of the lens is reversed, i.e. the ophthalmic lens is illuminated from behind (given that the center and/or axis markings are provided on the front face of the lens) and the light that has passed through the lens is sensed from beside its front face, and secondly the translucent screen for sensing said light flux and disposed in front of the acquisition means is disposed as close as possible to the front face of the lens for centering so as to limit the distance traveled by the deflected light rays prior to being focused on the acquisition means.

Nevertheless, that requires the translucent screen to be mounted in movable manner on the structure of the device so as to allow it to be retracted in order to enable the handling peg to be deposited on the determined location of the front face of the ophthalmic lens.

That complex mounting of the screen on the structure of the device increases the size of the device, its manufacturing cost, and above all does not ensure that measurement accuracy is long-lasting.

SUMMARY OF THE INVENTION

In order to remedy the above-mentioned drawbacks of the prior art, the present invention provides a method of manually centering, in a rim of spectacles frame, an ophthalmic lens that is provided with at least one center and/or axis marking, the method comprising the steps consisting in:

a) for calibration purposes, acquiring and storing the shadow of a predetermined geometrical figure formed on a transparent sign support interposed between lighting means and acquisition means while said support is being illuminated on its own by said lighting means, the geometrical figure presenting a maximum outside dimension lying in the range 2 millimeters (mm) to 10 mm;

b) superposing said ophthalmic lens and said transparent sign support;

c) acquiring and storing the shadow of said geometrical figure of said support as detected by said ophthalmic lens while said ophthalmic lens and said support are being illuminated together by said lighting means;

d) using the acquisition means to acquire the shadow of the center and/or axis marking of the ophthalmic lens for centering while it is illuminated by said lighting means;

e) displaying on a display screen firstly the shadow of the center and/or axis marking of the ophthalmic lens, and secondly a virtual centering target corresponding to the position desired for the center marking of the lens relative to a reference point of the rim of the frame;

f) from the prismatic deflection of the geometrical figure as measured by comparing the acquisitions of steps a) and c), deducing a corrected relative position for the reference point of the frame rim relative to the center marking, or vice versa; and g) putting the shadow of the centering marking of the ophthalmic lens manually into coincidence with the centering virtual target.

Advantageously, in the method in accordance with the invention, in step c), the shadow of the outline of the ophthalmic lens for centering is acquired, and in step d) there is displayed on the display screen firstly said shadow of the outline of the lens and secondly a virtual image representative of the corresponding rim of the frame, being offset independently of the reference point of said frame rim relative to the centering virtual target associated with said frame rim in order to compensate for the prismatic deflections induced by the lens for centering.

The invention also provides a method of centering and blocking an ophthalmic lens, the method comprising centering said lens by the above-defined method, and depositing a handling peg at a predetermined location on said ophthalmic lens, account being taken of the corrected position of the reference point of the frame rim as calculated in step f).

The invention also provides a centering and blocking device for implementing the above-defined method, the device comprising:

receiver means for receiving the ophthalmic lens;

on either side of said receiver means, firstly lighting means for illuminating the ophthalmic lens installed on said receiver means, and secondly acquisition and analysis means for acquiring and analyzing the light transmitted through said ophthalmic lens; and a transparent support including a geometrical figure presenting a maximum outside dimension lying in the range 2 mm to 10 mm, that is activatable and deactivatable, and that is disposed between said receiver means and said acquisition and analysis means.

Other characteristics of the device of the invention that are non-limiting and advantageous are as follows:

the geometrical figure occupies an area lying in the range 3 square millimeters (mm$^2$) to 80 mm$^2$;

the geometrical figure is of a shape that is different from a point or a cross, being suitable for being distinguished visually from a marking on the ophthalmic lens;

the geometrical figure is a polygon, preferably a triangle;

the geometrical figure is a circle or an oval;

said receiver means, said lighting means, said acquisition and analysis means, and said transparent sign support are held stationary relative to one another;

the device includes a single optical path between said lighting means and said acquisition and analysis means;

said transparent sign support is a transparent active screen suitable for selectively displaying the geometrical figure;

said transparent screen is a liquid crystal screen;

said transparent sign support comprises a regular array of repeated opaque patterns;

said transparent sign support comprises a Hartmann matrix;

the device includes means for placing a handling peg at a location on the front face of said ophthalmic lens that has been determined by calculation;

said means for placing the handling peg are automatic means;

said means for placing the handling peg are manual means;

said acquisition and analysis means comprise a digital camera;

said acquisition and analysis means comprise image processing means adapted to process the signal obtained at the output from the digital camera and means for displaying the processed signal; and said acquisition and analysis means comprise, between the transparent sign support and the digital camera, an optical reflector system for reflecting the light beam and including a mirror inclined at 45°.

BRIEF DESCRIPTION OF THE DRAWINGS

The description below with reference to the accompanying drawings, given as non-limiting examples, shows clearly what the invention consists in and how it can be implemented.

In the accompanying drawings:

FIG. 5B is a diagram showing the frame of reference of the display; and

FIG. 5C is a diagram in which the frames of reference of FIGS. 5A and 5B are superposed.

DETAILED DESCRIPTION OF THE PREFERRED EMBODIMENTS

Figure 1:
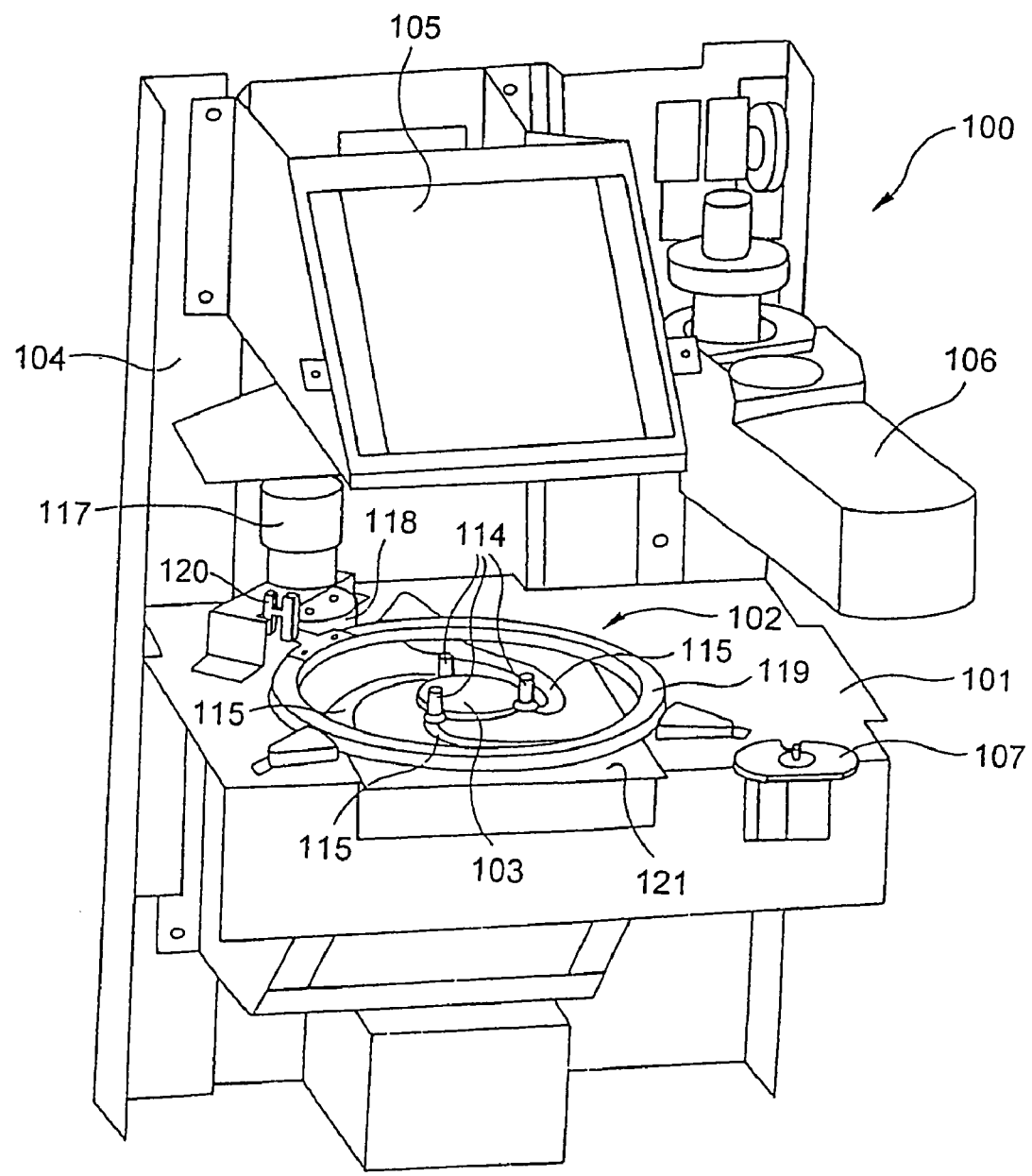
FIG. 1 is an overall perspective view of a center and/or blocking device of the invention.

FIG. 1 is a diagram of an embodiment of a centering and blocking device 100 of the invention comprising a workbench 101 on which there is placed a centering mechanism 102 for an ophthalmic lens 103. The lens may be single-vision, bifocal, trifocal, or indeed an ophthalmic lens with progressive addition of power.

The centering and blocking device 100 further comprises a display screen 105 secured to the structure 104 in such a manner as to be visible to a user working at the workbench 101.

The centering mechanism 102 of the workbench 101 has a set of three jaws 114 for concentric clamping, each jaw being carried on an arm 115 that pivots about an axis (not visible in FIG. 1) that is stationary relative to the workbench 101. The arms are arranged in such a manner that on pivoting simultaneously about their respective axes they enable the three jaws 114 to move towards one another.

The clamping of the jaws 114 is controlled by a motor 117 having a shaft secured to a gearwheel 118 meshing with a ring 119 adapted to cause the arms 114 to pivot about their axes.

Each of the arms 115 has a semicircular toothed portion (not shown) meshing with the outer periphery of the ring 119.

When the gearwheel 118 turns under drive for the motor 117, it causes the ring 119 to rotate, thereby causing the jaws 114 to clamp or unclamp depending on the direction in which the ring 119 is being driven. An optical or an electromagnetic cell 120 serves to inform the motor 117 about the position of the ring 119.

The assembly formed by the arms 115 carrying the jaws 114, and by the ring 119 is placed over a transparent support plate 121.

Furthermore, as shown in FIG. 1, the centering and blocking device has a positioning arm 106, preferably an automatic arm, connected to the structure 104 and adapted to use a clamp to take hold of a handling peg placed on a receptacle 107 and deposited at a location that is determined by calculation on the front face of said ophthalmic lens 103.

For this purpose, the centering and blocking device 100 is adapted to detect and display the precise configuration of a center and/or axis marking of the ophthalmic lens 103.

Figure 2:
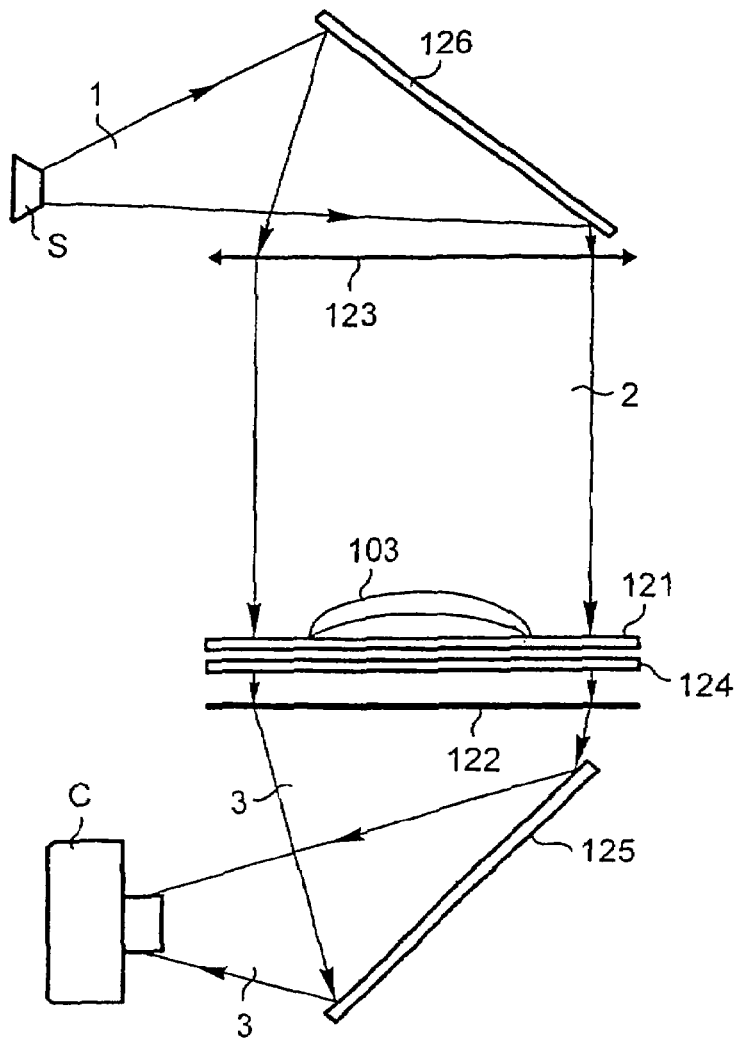
FIG. 2 is an optical diagram of the FIG. 1 device.

For this purpose, and as shown diagrammatically in FIG. 2, the device advantageously comprises:

receiver means for receiving the ophthalmic lens 103;
on either side of said receiver means, firstly means for illuminating the ophthalmic lens 103 installed on said receiver means, and secondly means for acquiring the shadow, or which comes to the same but in the negative, the light transmitted through said ophthalmic lens 103; and
a transparent support 124 for an opaque sign 124A, 124B that is activatable and deactivatable, being disposed between said receiver means and said acquisition and analysis means.

In this example the receiver means is constituted by a support plate 121 that is transparent to light.

In the example shown, the illumination means comprise a light source S that emits a diverging light beam 1 towards a reflector system comprising a mirror 126 inclined at 145° and a converging lens 123 adapted to form a beam 2 of parallel light rays towards the ophthalmic lens 103 placed on the support plate 121 with its front face carrying the center and/or axis markings facing towards said converging lens 123.

In this example, the acquisition and analysis means comprise a digital camera C, image processor means (not shown) adapted to process the signal obtained at the output of the digital camera C, and display means for displaying the processed signal and constituted by the display screen 105. Between the transparent sign support 124 and the digital camera C, said acquisition and analysis means comprise an optical system for reflecting the light beam transmitted through the ophthalmic lens 103, comprising a translucent plate 122 forming a screen and a mirror 125 inclined at 45°. The digital camera C senses the images or shadows projected on the translucent screen 122 via the angular deflection performed by the inclined mirror 125.

Advantageously, in the centering and blocking device 100, said receiver means, said lighting means, said acquisition and analysis means, and said transparent sign support are held stationary relative to one another.

In addition, as shown in FIG. 2, the device includes a single light path between said lighting means and said acquisition and analysis means, thus presenting the advantage of reducing the overall size and the manufacturing costs of the device, and above all of making it possible to obtain measurements with precision that is long-lasting.

According to a characteristic of the centering and blocking device 100, said transparent sign support 124 is an active transparent screen suitable, when suitably activated by an associated electronic driver unit, for displaying said opaque sign. For example it is constituted by a liquid crystal screen.

When not activated, the transparent sign support 124 is equivalent to the transparent support plate 121 and it does not shown any opaque sign.

When it is activated, the transparent sign support 124 displays the opaque sign(s) used for detecting the positions of the center and/or axis markings of the ophthalmic lens 103.

Figure 3:
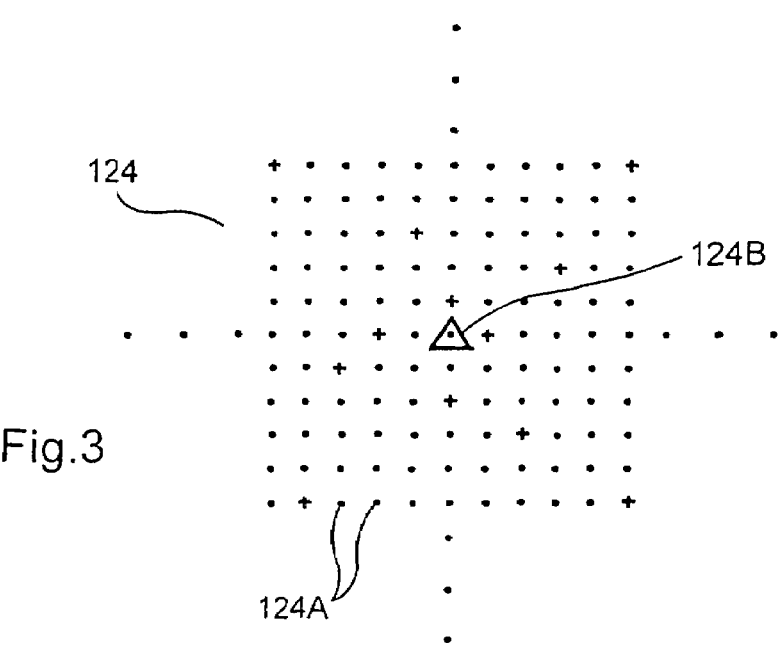
FIG. 3 is a diagrammatic plan view of the patterns of the transparent sign support of the FIG. 1 device.

As shown more particularly in FIG. 3, said transparent sign support 124 comprises a regular array of repeated opaque patterns 124. In particular, it comprises a Hartmann matrix.

In addition, and also shown in FIG. 3, said transparent sign support 124 includes, preferably at its center, a geometrical figure 124B of maximum outside dimension lying in the range 2 mm to 10 mm. This geometrical figure 124B covers an area lying in the range 3 mm$^2$ to 80 mm$^2$. It is an outline figure, different from a point or a cross, so as to distinguish it from a marking on the ophthalmic lens. In this example, the geometrical figure 124B is a polygon, preferably as shown an isosceles triangle having a base of 4 mm, but in variants that are not shown, this geometrical figure could be a circle or an oval.

Advantageously, the centering. and blocking device 100 as described above enables a method of automatically detecting the position of a mark present on one of the faces of the lens to be performed, the mark typically being present on the convex front face of the lens. In the example described, and in order to have a concrete idea, the purpose is to detect the position of a center and/or axis marking on the ophthalmic lens 103 in the corresponding rim of the frame in which the lens is to be mounted. This method comprises the following steps.

Step a

For calibration purposes, acquiring and storing the shadow of an opaque sign 124B formed on the transparent sign support 124 while activated and illuminated on its own by the lighting means S.

Step b

Superposing the ophthalmic lens 103 and the associated transparent sign support 124.

Step c

Acquiring shadow of the sign of said support as illuminated by the lighting means S and storing it in a random access memory (RAM) of the processor means.

Step d

Acquiring the shadow of the center and/or axis marking of the ophthalmic lens 103 when illuminated by said lighting means S and storing it in the RAM, the transparent support then being deactivated and thus not presenting any opaque sign.

Step e

From the prismatic deflection of the matrix 124A (or from the geometrical figure 124B in the event of the detection method using the array 124A failing, e.g. because of difficulty in recognizing the image leading to confusion in detecting deflected points of the array, in particular due to confusion with an engraving on the lens) as measured by comparing the acquisitions performed in steps a) and c), deducing the non-deflected corrected position of said marking on the front face of said lens.

This method of automatically detecting the position of the center and/or axis marking of the ophthalmic lens makes it possible to center the ophthalmic lens 103 so as to place the handling peg at a determined location on the front face of the lens 103, thus making it possible subsequently to block and rotate the lens 103 in a grinding machine in order to match its shape to the rim of the selected frame.

Conventionally, the lens 103 that is to be centered and/or that is to have its axis determined possesses one or more center markings. These markings include firstly a center marking indicating the center point of the lens and conventionally implemented in the form of a point or a cross (or any other pattern), and secondly, optionally, one or more axis markings determining the astigmatism axis of the lens and conventionally implemented in the form of a straight line or a point (or any other pattern).

In order to center and optionally determine the axis of said ophthalmic lens 103, either automatically or manually, prior to above-specified steps a) to d), the operator informs the centering and blocking device via a control pad about the type of ophthalmic lens to be centered, the position desired for the center point PC of the lens 103 (see FIGS. 5A to 5C) relative to the boxing center CB which is the center of the selected frame (see definition below given with reference to FIGS. 5B and 5C), and for cylindrical single-vision ophthalmic lenses, possibly also the orientation desired for the axis of the lens.

Figure 5A:
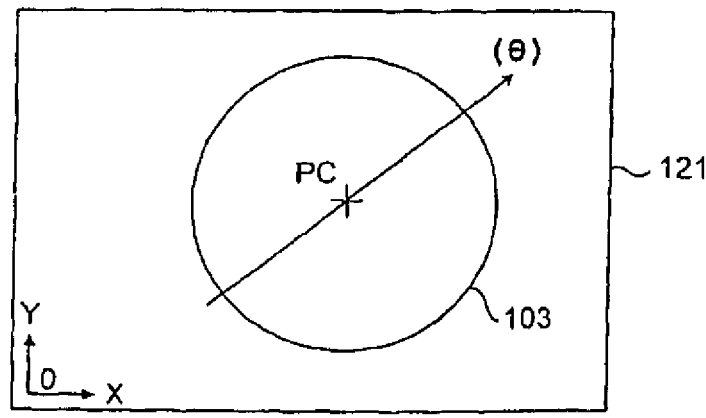
FIG. 5A is a diagram showing the frame of reference of the camera.

The above-mentioned parameters comply with a centering convention that includes firstly a measurement frame of reference (O, X, Y) associated with the camera and shown in FIG. 5A, and secondly a display frame of reference (O', X', Y') associated with the frame and shown in FIG. 5B.

In the measurement frame of reference (O, X, Y), the camera C is used to acquire the center point PC of the ophthalmic lens as identified by coordinates $X_{PC}, Y_{PC}$, together, where appropriate, with the axis marking(s) of the lens 103.

Concretely, the nature of the center point depends on the type of lens in question.

For a single-vision lens, the center point PC is the previously-marked optical center.

For a bifocal lens, the center point PC is the center of the near vision segment.

For a lens with progressive power addition, the center point PC is the center cross.

Furthermore, as can be seen in FIG. 5A, the orientation of the ophthalmic lens is identified by an angle θ which is the angle between a particular axis of the lens and the axis X of the measurement frame of reference.

Depending on circumstances, this particular axis is:

the cylinder axis for a toroidal single-vision lens;

the axis of the horizontal markings for a progressive lens; or the axis of the near vision segment for a bifocal lens.

The display frame of reference relates to the selected frame. This frame has two rims (of arbitrary and not-necessarily circular shape) each serving to receive one lens. Specifically, the rim shown presents a curved shape in the X, Y frame of reference. A center is defined for the frame rim. Conventionally, it is possible for example to define as the center of the frame rim, as the center of the rectangle in which the frame rim can be inscribed. This center is known as the "boxing" center and is referenced CB, being identified by its ordinates $X'_{CB}, Y'_{CB}$ in the (O', X', Y') frame of reference.

The handling peg is generally secured to the lens at its boxing center CB.

The difference that is desired in X and Y terms between the center point PC and the boxing center CB is input by the operator into the centering and blocking device 100. It depends on the prescription, on the morphology of the wearer, and on the shape of the frame.

This difference presents the following coordinates in the (O', X', Y') frame of reference:

$$\delta X' = X'_{PC} - X'_{CB}, \delta Y' = Y'_{PC} - Y'_{CB}$$

(see FIG. 5C).

In FIG. 5C, θ' denotes the angle desired for the axis of the ophthalmic lens in the display frame of reference (O', X', Y'), and thus in the frame of reference of the frame (see FIG. 5C).

After inputting the above-specified centering parameters into the centering and blocking device, the operator places the lens on its support and the centering operation can begin.

Two modes of operation are provided: an automatic mode and a semi-automatic or assisted manual mode.

In automatic mode, the operator begins by placing the ophthalmic lens 103 in an arbitrary position on the transparent support plate 121 (see FIG. 1) with its front face facing towards said lighting means. Once parameter input has been confirmed, the jaws 114 clamp onto the ophthalmic lens 103 and the centering operation can begin.

Steps a) to d) of the detection method are then performed on the ophthalmic lens 103.

Then, after step d), when the lens is a single-vision ophthalmic lens, the image obtained in step c) is subjected to rotation and/or translation so as to place the center point and the axis of the ophthalmic lens in the desired position in the display frame of reference prior to displaying the image as calculated in this way with the outline of the ophthalmic lens being encrusted together with the shape of the frame (see FIG. 5C).

When the ophthalmic lens has progressive power addition or is a bifocal lens, then after step d) of calculating the non-deflected corrected position of said centering mark on the front face of said ophthalmic lens, the image obtained in step c) is subjected to rotation and/or translation so as to place the center point and the axis of the ophthalmic lens in the desired position in the display frame of reference prior to displaying the image as calculated in this way with the encrusted outline of the ophthalmic lens and the shape of the frame (see FIG. 5C). The correction of the deflection of the light beams transmitted through the lens is transferred to the display by moving the image. of the shape of the frame.

When the centering and blocking device 100 is operating in manual mode, the jaws 114 are clamped while empty so as to form a tripod on which the ophthalmic lens 103 for centering is positioned. The image of the ophthalmic lens 103 as observed by the digital camera C is displayed in real time on the display screen 105 of the centering and blocking device 100.

When the ophthalmic lens is a single-vision lens, its optical center and optionally its axis are initially marked by means of a frontofocometer.

Thereafter, the centering and blocking device 100 is used to perform the following steps.

Step a)

For calibration purposes, acquiring and storing the shadow of the predefined geometrical figure 124B formed on the transparent sign support 124 as illuminated on its own by the illumination means, with the geometrical figure, in this case a triangle, having a maximum outside dimension lying in the range 2 mm to 10 mm.

Step b)

Superposing the ophthalmic lens 103 and the transparent sign support 124.

Step c)

Acquiring and storing the shadow of said geometrical figure 124B of said support 124 as deflected by said ophthalmic lens 103 when both it and said support 124 are illuminated by said lighting means S.

Step d)

Using the acquisition means, i.e. the camera C, to acquire the shadow of the center and/or axis marking PC of the ophthalmic lens 103, while it is illuminated by the lighting means S, but not storing it.

Simultaneously, acquiring the shadow of the outline of the ophthalmic lens 103 for centering.

Step e)

Using display screen 105 to display simultaneously the shadow of the center and/or axis marking PC of the ophthalmic lens 103, and a virtual centering target CC corresponding to the position desired for the center mark PC of the lens 103 relative to the reference point CB for the rim 200 of the frame.

This shadow of the outline of the lens 103 and a virtual image 200 representative of the rim concerned of the frame are displayed simultaneously on the display screen 105. This virtual image of the rim of the frame 200 is offset by calculation independently of the reference point CB of said rim of the frame, relative to the virtual centering target CC associated with the center of the frame 200 in order to compensate for the prismatic deflections induced by the lens 103 that is to be centered.

Step f)

From the prismatic deflection of the geometrical figure 124B as measured by comparing the acquisitions performed in steps a) and c), deducing a corrected relative position CBc for the reference point CB of the rim of the frame 200 relative to the center mark PC of the ophthalmic lens 103, or vice versa.

Step g)

Moving the lens manually so as to bring the shadow of the center mark PC of the lens 103 manually into coincidence with the virtual centering target CC.

Steps a) to g) are not necessarily performed in the same order as those steps are listed above, and could be varied as a function of the operating procedure used.

In a particularly advantageous implementation, steps c) to f) are performed in a loop following steps a) and b), so as to obtain continuously a corrected relative position CBc for the reference point CB of the frame rim 200.

The operator displaces the lens manually so as to cause the image obtained in step c) to perform movement in rotation and/or translation in such a manner as to place the center point and the axis of the ophthalmic lens in the desired position in the display frame of reference, prior to displaying the image as calculated in this way encrusted with the outline of the ophthalmic lens and the shape of the frame (see FIG. 5C). The correction of the deflection of the light beam as transmitted through the lens is applied in real time to the display by moving the image of the shape of the rim 200 of the frame accordingly.

In another implementation that is simpler to perform, steps d) and e) are performed in a loop after steps a) and b), while steps c) and f) are performed once again after step g). The correction for the deflection error on the center marking is then not forwarded in real time to the display screen, but is taken directly into account in the positioning information transmitted to the blocking arm for putting a handling peg into position.

Figure 4:
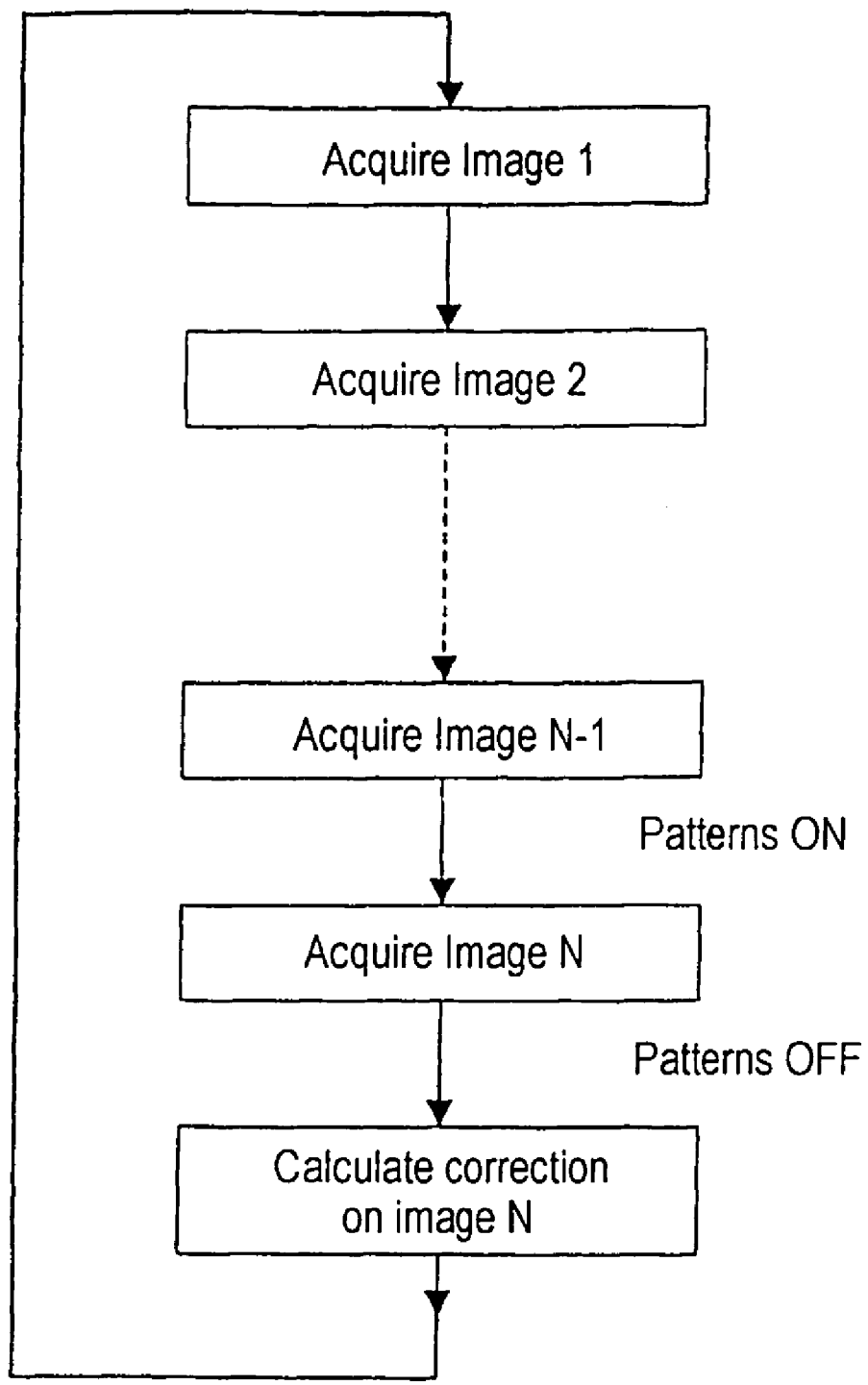
FIG. 4 shows an algorithm of a centering method of the invention with short-term display of the transparent sign support of the FIG. 1 device.
Figure 4:
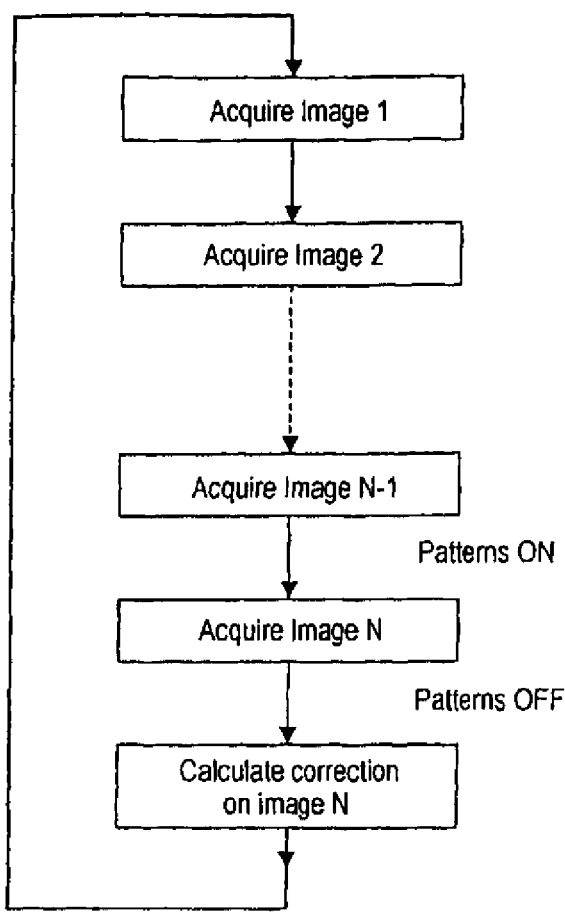

In a variant implementation of the above-described manual centering method, it is proposed to combine the advantages of correcting the prismatic deflection of the position of the marking of the lens with a comfortable display for the operator by displaying the patterns 124A, 124B of the transparent sign support 124 cyclically, synchronizing acquisition of the image of the lens 103 when said patterns 124A, 124B are activated, and calculating the correction of the prismatic deflection induced by the lens on said captured image in application of the cycle shown in FIG. 4.

More particularly, the method of manual centering the ophthalmic lens 103 using the centering and blocking device comprises the following steps.

Step a)

For calibration purposes, acquiring and storing the shadow of an opaque sign (e.g. the geometrical figure 124B) formed on the transparent sign support 124 interposed between the lighting means and the acquisition and analysis means C, while said support 124 is illuminated on its own by said lighting means.

Step b)

Superposing said ophthalmic lens 103 on the transparent sign support 124.

Step c)

Acquiring and storing the shadow of the opaque sign 124A, 124B of said support 124 as deflected by said ophthalmic lens 103 when both it and said support 124 are illuminated together by the lighting means S.

Step d)

Using the acquisition means C to acquire the shadow of the center and/or axis marking PC of the ophthalmic lens 103 while the lens is illuminated by said lighting means.

Simultaneously acquiring the shadow of the outline of the ophthalmic lens 103 for centering.

Step e)

Using a display screen 105 to display simultaneously, directly from the acquisition and analysis means, the shadows of the ophthalmic lens 103, of the center mark PC of the lens 103, and of the opaque sign 124B when it is activated, and also a virtual centering target CC corresponding to the desired position for the center mark PC of the lens 103 that is to be centered relative to a reference point CB of the rim 200 of the frame. The opaque sign 24B of the transparent sign support 124 is displayed intermittently for a display duration that is short enough for the human eye not to perceive its shadow on the display screen.

The display screen 105 is used to display both said shadow of the outline of the lens 103 and a virtual image 200 representative of the corresponding rim of the frame. This virtual image of the rim of the frame 200 is shifted independently of the reference point CB of said frame rim, relative to a virtual centering target CC associated with said frame rim, in order to compensate for the prismatic deflections induced by the lens 103 for centering.

Step f)

From the prismatic deflection of the geometrical figure 124B as measured by comparing the acquisitions performed in steps a) and c), deducing a corrected relative position CBc for the reference point CB of the frame rim 200 relative to the center mark PC, or vice versa.

Step g)

By manually displacing the ophthalmic lens 103, putting the center mark PC of the ophthalmic lens 103 into coincidence with the virtual centering target CC.

In this case likewise, steps a) to g) are not necessarily performed in the order in which those steps are described above, and on the contrary can vary as a function of the operating procedure used. The operator displaces the lens manually so as to cause the image obtained in step c) to move in rotation and/or in translation so as to place the center point and the axis of the ophthalmic lens in the desired position in the display frame of reference before displaying the image as calculated in this way with the encrusted outline of the ophthalmic lens and the shape of the frame (see FIG. 5C). The correction for the deflection of the light beam transmitted through the lens is forwarded in real time to the display by moving the image of the shape of the frame accordingly.

In a particularly advantageous implementation, steps c) to f) are performed in a loop after steps a) and b), so as to obtain continuously a corrected relative position CBc for the reference point CB of the rim of the frame 200.

In another implementation, that is simpler to implement, steps d) and e) are performed in a loop after steps a) and b) while steps c) and f) are performed once only after step g). The correction for the deflection error of the center mark is then not forwarded to the display screen but is merely taken into account in the positioning information transmitted to the blocking arm in order to deposit a handling peg.

Thus, advantageously, using this method of the invention, the display of the shadow of the opaque sign of the transparent support that is used for determining the prismatic deflection of the position of the lens mark and for correcting the resulting detection error is eliminated from the display on the display screen. This avoids disturbing reading of the display screen by the operator who then sees on the screen only the image of the lens and the image of the sights, while taking account of the determined correction for prismatic deflection.

This centering method contributes to blocking the ophthalmic lens 103. It is thus after said lens has been centered by the above-described method that the automatic positioning arm 106 is used to deposit a handling peg at a predetermined location on the ophthalmic lens 103.

For this purpose, the electronic processor unit calculates the corrected location where the handling peg is to be deposited, taking account of the corrected position CBc of the reference point CB for the rim of the frame 200 as calculated in step f).

The present invention is not limited in any way to the implementations described and shown, and the person skilled in the art will know how to make any variant in the spirit of the invention.

The invention claimed is:

1. A method of manually centering, in a rim of a spectacles frame, an ophthalmic lens that is provided with at least one center and/or axis marking, the method comprising the steps of:
   a) for calibration purposes, acquiring and storing a shadow of an opaque sign formed on a transparent sign support interposed between lighting means and acquisition means while said support is being illuminated on its own by said lighting means;
   b) superposing said ophthalmic lens and said transparent sign support;
   c) acquiring and storing the shadow of said opaque sign of said support as deflected by said ophthalmic lens while said ophthalmic lens and said support are being illuminated together by said lighting means;
   d) using the acquisition means to acquire a shadow of the center and/or axis marking of the ophthalmic lens for centering while it is illuminated by said lighting means and superposed on said transparent sign support;
   e) displaying on a display screen visible to an operator firstly the shadow of the center and/or axis marking of the ophthalmic lens, and secondly a virtual centering target corresponding to a position desired for the center marking of the lens relative to a reference point of the rim of the frame;
   f) from the prismatic deflection of the opaque sign as measured by comparing the acquisitions of steps a) and c), deducing a corrected relative position for the reference point of the frame rim relative to the center marking, or vice versa; and
   g) putting the shadow of the centering marking of the ophthalmic lens into coincidence with the centering virtual target.

2. The centering method according to claim 1, wherein steps c) to f) are performed in a loop after performing steps a) and b), so as to continuously obtain a corrected relative position for the reference point of the frame rim.

3. The centering method according to claim 2, wherein in step c), the shadow of the outline of the ophthalmic lens for centering is acquired and in step d) there is displayed on the display screen firstly said shadow of the outline of the lens and secondly a virtual image representative of the corresponding rim of the frame, being offset independently of the reference point of said frame rim relative to the centering virtual target associated with said frame rim in order to compensate for the prismatic deflections induced by the lens for centering.

4. The centering method according to claim 1, wherein steps d) and e) are performed in a loop, following steps a) and b), and steps c) and f) are performed after step g).

5. The centering method according to claim 1, wherein in step e), there is displayed on the display screen, firstly directly from the acquisition and analysis means, the shadows of the ophthalmic lens for centering, of the center and/or axis marking of said ophthalmic lens, and of the opaque sign while it is being activated, and secondly the centering virtual target, the opaque sign of the transparent sign support being activated intermittently for a duration that is short enough to ensure that the human eye does not perceive its shadow on the display screen.

6. The method of centering and blocking an ophthalmic lens, the method comprising centering said lens using the method according to claim 1, and depositing a handling peg at a predetermined location on said ophthalmic lens, account being taken of the corrected position of the reference point of the frame rim as calculated in step f).

7. The centering and blocking device for implementing the method according to claim 6, the device comprising:
   receiver means for receiving the ophthalmic lens;
   on either side of said receiver means, firstly lighting means for illuminating the ophthalmic lens installed on said receiver means, and secondly acquisition and analysis means for acquiring and analyzing the light transmitted through said ophthalmic lens; and
   a transparent support including an opaque sign representing a geometrical figure presenting a maximum outside dimension lying in the range 2 mm to 10 mm, that is activatable and deactivatable, and that is disposed between said receiver means and said acquisition and analysis means.

8. The device according to claim 7, wherein the geometrical figure occupies an area lying in the range 3 $mm^2$ to 80 $mm^2$.

9. The device according to claim 7, wherein the geometrical figure is of a shape that is different from a point or a cross, being suitable for being distinguished visually from a marking on the ophthalmic lens.

10. The device according to claim 7, wherein the geometrical figure is a polygon.

11. The device according to claim 7, wherein the geometrical figure is a circle or an oval.

12. The device according to claim 7, wherein said receiver means, said lighting means, said acquisition and analysis means, and said transparent sign support are held stationary relative to one another.

13. The device according to claim 7, wherein the device includes a single optical path between said lighting means and said acquisition and analysis means.

14. The device according to claim 7, wherein said transparent sign support is a transparent active screen suitable for selectively displaying the geometrical figure.

15. The device according to claim 14, wherein said transparent screen is a liquid crystal screen.

16. The device according to claim 7, wherein said transparent sign support comprises a regular array of repeated opaque patterns.

17. The device according to claim 16, wherein said transparent sign support comprises a Hartmann matrix.

18. A method of manually centering an ophthalmic lens in a rim of a spectacle frame, said ophthalmic lens having at least one of a center marking and an axis marking, the method comprising the steps of:
  a) for calibration purposes, acquiring and storing a shadow of an opaque sign formed on a transparent sign support interposed between a light source and an acquisition device while the support is being illuminated by the light source;
  b) superposing the ophthalmic lens and the transparent sign support;
  c) acquiring and storing the shadow of the opaque sign of the transparent sign support as deflected by the ophthalmic lens while the ophthalmic lens and the transparent sign support are being illuminated together by the light source;
  d) using the acquisition device to acquire a shadow of at least one of the center marking and the axis marking of the ophthalmic lens while the ophthalmic lens is illuminated by the light source and superposed on the transparent sign support;
  e) displaying on a display screen visible to an operator the shadow of at least one of the center marking and the axis marking of the ophthalmic lens, and a virtual centering target corresponding to a position desired for the center marking of the ophthalmic lens relative to a reference point of the rim of the frame;
  f) from the prismatic deflection of the opaque sign as measured by comparing the acquisitions of steps a) and c), deducing a corrected relative position for the reference point of the frame rim relative to a center marking, or deducing a corrective relative position for the reference point of the center marking relative to the frame rim; and
  g) making coincident the shadow of the center marking of the ophthalmic lens with the virtual centering target, wherein the opaque sign is a closed geometrical figure.

19. The device according to claim 10, wherein the polygon is a triangle.

* * * * *

UNITED STATES PATENT AND TRADEMARK OFFICE
CERTIFICATE OF CORRECTION

| | | |
|---|---|---|
| PATENT NO. | : 7,527,377 B2 | Page 1 of 2 |
| APPLICATION NO. | : 10/590346 | |
| DATED | : May 5, 2009 | |
| INVENTOR(S) | : Fabien Divo | |

It is certified that error appears in the above-identified patent and that said Letters Patent is hereby corrected as shown below:

Replace "Sheet 3 of 4" of the drawings with the accompanying new Sheet 3 of 4.

Signed and Sealed this

Sixteenth Day of June, 2009

JOHN DOLL
*Acting Director of the United States Patent and Trademark Office*